Oct. 5, 1948.　　　　　C. J. CRANE　　　　　2,450,421
APPARATUS FOR SIMULATING WIND EFFECTS
IN AVIATION GROUND TRAINERS
Filed May 8, 1940　　　　　　　　　　2 Sheets-Sheet 1
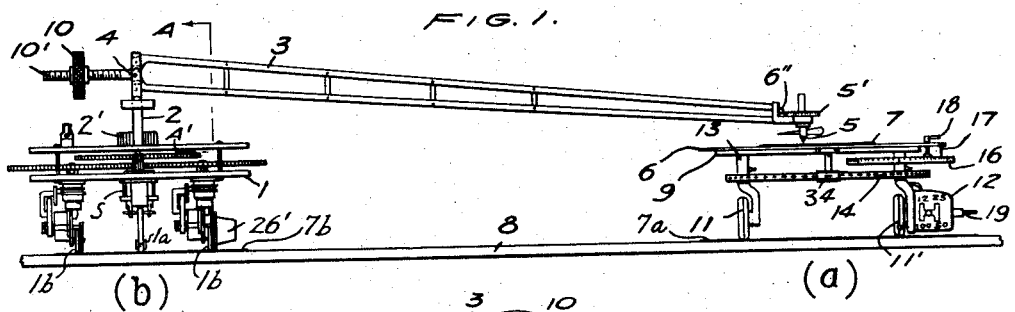
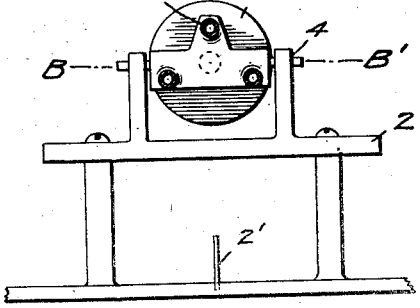
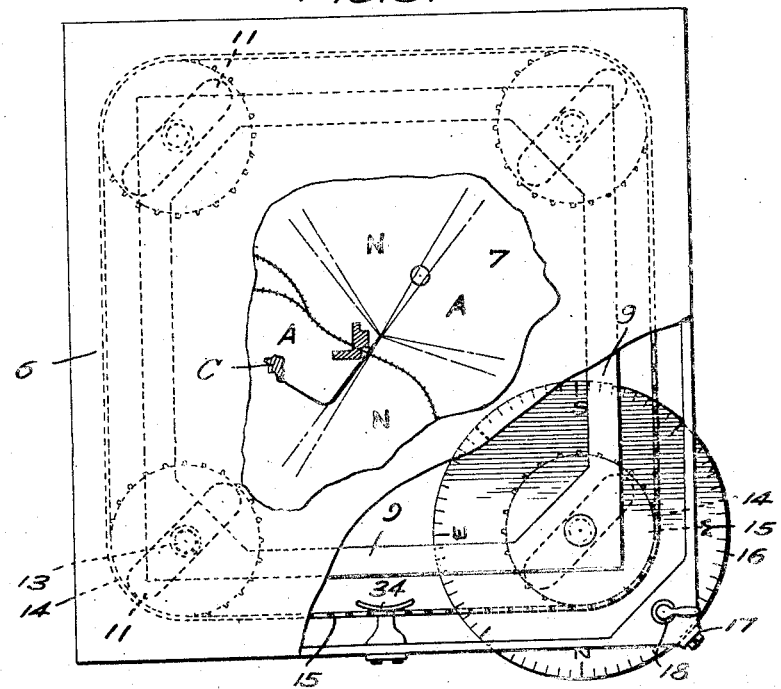
INVENTOR
CARL J. CRANE Oct. 5, 1948. C. J. CRANE 2,450,421
APPARATUS FOR SIMULATING WIND EFFECTS
IN AVIATION GROUND TRAINERS
Filed May 8, 1940 2 Sheets-Sheet 2
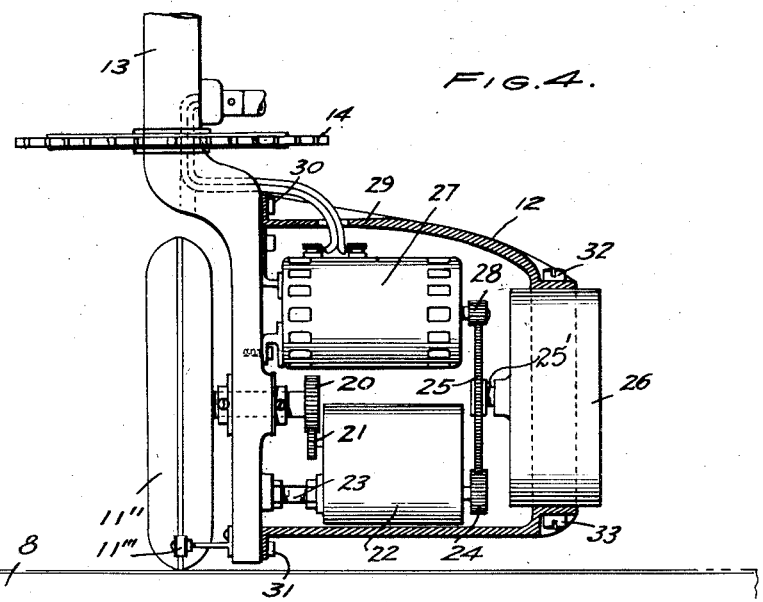
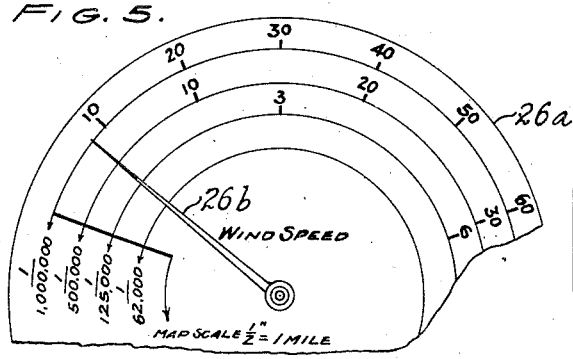
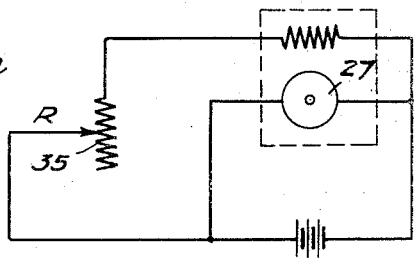
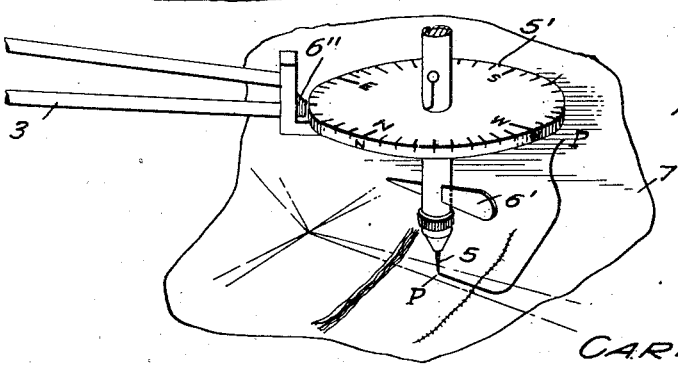
INVENTOR
CARL J. CRANE
BY Edgar H. Snodgrass
and Wade Koontz
ATTORNEYS Patented Oct. 5, 1948

2,450,421

UNITED STATES PATENT OFFICE 2,450,421

APPARATUS FOR SIMULATING WIND EFFECTS IN AVIATION GROUND TRAINERS

Carl J. Crane, Dayton, Ohio

Application May 8, 1940, Serial No. 334,002

10 Claims. (Cl. 346—8)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device for simulating the effects of wind in aviation ground trainers and for obtaining simultaneous and related records pertaining to wind path, ground path and air path during the simulated flight of a ground trainer and is an improvement on the apparatus for simulating wind effects disclosed in my copending application Serial No. 323,562, filed March 12, 1940, and in copending application Serial No. 320,880, filed February 26, 1940, in the names of Carl J. Crane, George V. Holloman, Carl W. Muller, and Raymond K. Stout, for improvements in "Interception trainer."

The purpose of this invention is to provide means for introducing the effects of wind into the problem confronting the student taking instruction in a ground trainer similar to the well-known type of trainer identified as the Link trainer. It is, of course, well known that the Link trainer used at the present time is not supplied with effective and simple means for introducing the effect of wind in the problem of navigating, particularly by conventional radio means.

Another purpose of this invention is not only to supply means for accomplishing training in which the effect of winds is introduced into the problem of blind flying, but also to supply apparatus of an essentially simple nature which may be supplied to existing devices now used in co-operation with ground trainers. It is, of course, desirable that devices of an essentially accessory nature be used in the solution of the problem of wind for ground trainers in order that apparatus now in existence and being used need not be discarded. The subject invention therefore proposes the use of novel accessory devices for application to the currently used course recorder. This invention supplies novel means by which it is possible in a very few moments to adjust the conventional course recorder now used in ground trainers in such a manner that all problems concerned with changing wind speeds and wind direction may be introduced into the problem of navigation while taking instruction in ground training devices.

Another purpose of this invention is to obtain simultaneous graphic records pertaining to the air path, and the ground path of the simulated flight of the ground trainer and also the ground path of the simulated wind introduced into the problem.

Another purpose of this invention is to convey a study of navigation factors involving the vectorial relationship of ground speed, air speed and wind speed and the times and distances involved therein to the student taking instruction in the ground trainer, be this instruction simulated blind flight instruction or simply instruction relating to fundamental problems of air navigation.

Another purpose of this invention is to provide a simple device for studying any problem involving three vectors related to each other and which pertain to movement and the resulting vectorial analysis thereof.

Other purposes and uses of this invention will become apparent in the description that follows.

In order to obtain a clear idea of the novel features of this invention reference is made to the attached drawings wherein the numerals refer to like parts in the various figures.

Figure 1 shows a general view of the invention applied to a conventional type of course recorder.

Figure 2 is a section taken substantially on the line AA' of Figure 1.

Figure 3 is a plan view of the wind-recorder carriage shown at Figure 1 (a), a portion of the structure being broken away for the purposes of illustration.

Figure 4 is a partial section of one form of a driving element of the device shown at Figure 1 (a).

Figure 5 is a partial front elevation of the dial of a tachometer illustrated in Figure 4.

Figure 6 is a diagram of the electric circuit employed in controlling the speed of the motor of Figure 4; and Figure 7 is a fragmentary detailed view of the recording element attached to the end of the stylus arm of Figure 1.

Referring now to Fig. 1, and particularly the portion thereof indicated by the reference character (b), the reference numeral 1 generally indicates a course recorder of conventional type used in conjunction with aviation ground trainers and fully illustrated and described in United States Patent No. 2,179,663, granted to Edwin A. Link, Jr. Such a recorder comprises a frame supported by three steerable rollers which are interconnected by gearing to an autosynchronous receiver motor, such as indicated at S, Fig. 1 (b), which is responsive to the control of a corresponding autosynchronous transmitter, actuated by the aviation ground trainer as it changes its heading. The rollers are thus steered under the control of the trainer so that the instant heading of the course recorder corresponds to the instant heading of the trainer. Two of the steerable course-recorder rollers, such as indicated at 1b, Fig. 1 (b), are driven by small electric motors at a speed such that the course recorder is propelled over the surface of a reference chart at a velocity proportional to an assumed air speed of the associated ground trainer. The third roller or marker wheel of the course recorder—such as the roller 1a, Fig. 1 (b)—is adapted to be inked by an ink-saturated felt pad and to thus record the assumed trainer course on the reference chart, such as indicated at 7b. The marker wheel also serves as an indicating element to indicate the instant assumed position of the trainer during the assumed flight, relative to the chart. It is obvious that the trace of the course recorder on the reference chart represents the actual assumed course or ground track of the trainer, only when still-air flight conditions are assumed.

Course recorders of the character described are generally provided with a handle secured to the upper portion of the frame, for transporting the recorder from one place to another; and in the recorder 1 of Fig. 1 (b) this handle has been removed and replaced by a bracket 2, which serves as a support for the stylus arm 3, which is pivotally mounted by means of a shaft 4 journalled in the bracket 2, so that the arm 3 may rotate about the axis BB' of Fig. 2. The stylus arm 3 is preferably constructed of some light tubular material fastened by rivets to form a light beam structure and is counterbalanced by the weight 10, which is adjustably mounted on the threaded extension 10' of the stylus arm 3. This stylus arm 3 is fitted with a tracing device 5 which may be constructed in the form of a pencil or pen of conventional design, in order that any movement of the course recorder 1 may be transmitted to, and in fact draw a line upon a suitable map or chart 7 placed on the surface 6, thereby leaving a trace of the movement of the course recorder 1 and its extension on the chart or map 7 as shown in Figure 3.

The pen tracer 5 as best illustrated in Fig. 7 is fitted with a vane 6' and a compass rose 5' in order that alignment of the vane 6' with the latest direction of trace of the line pp may indicate the course of the simulated ground trainer flight in distinction to the heading indicated on the heading indicator element 2' of the conventional course recorder. The index 6" assists in reading the correct course angle. A determination of ground speed is arrived at by timing by stop watch the passage of the pen tracer 5 between such map details as the railroad and stream shown on the map (Figure 7). The means for introducing the effects of winds into the trainer problems is based on the principle that the ground track or course of an aircraft with respect to the earth, when encountering winds, is the resultant of two vectors—one, the air speed and instant heading of the aircraft; and, second, the velocity and instant heading of the wind which bodily displaces the aircraft relative to the earth. In the present invention, as previously explained, the movement of the course indicator relative to the chart 7b (Fig. 1 (b)) corresponds to the instant heading of the trainer and it moves with a velocity proportional to the assumed air speed of the trainer; and therefore the marker or tracing device 5 has an absolute motion relative to the table 8 which supports the course recorder 1 equivalent to the instant heading of the trainer and proportional to the assumed air speed thereof. In order to introduce the effect of winds, it is necessary to cause the chart 7, upon which the tracer 5 imprints a record, to have an absolute motion relative to the table 8 in a direction and at a velocity proportional to the direction and velocity, respectively, of an assumed wind, the absolute motions then combining to give a relative motion between the marker 5 and the chart 7 to represent the true ground track of the assumed flight of the trainer. In accordance with the present invention, the means for creating the necessary relative motion between the marker 5 and the chart 7 will be hereinafter termed a wind-recorder carriage and generally indicated by the reference numeral 9 in Fig. 1 (a). The wind-recorder carriage 9 is, therefore, that element of the present invention which generates a suitable movement which permits of the introduction of the effects of wind into the ground trainer operation. The stylus arm 3, with its associated marking device 5 and counterweight 10, is simply a means of transferring the independent motion of the course recorder 1 to the wind-recorder carriage 9 and its associated chart or map 7.

In order to get a clear idea of the novel features of the wind recorder carriage 9, reference is made again to the surface 6 (Fig. 1 (a)) which is preferably constructed of some material such as wood in order that a suitable chart or map may be readily fastened thereto. The surface or map board 6 is fastened to the chassis 9 of the wind recorder carriage by suitable screws (not shown), in order that any movement of the carriage may be imparted immediately to the map 7. The wind recorder carriage 9 is provided with, in the preferred form of the invention, four wheels or rollers 11, the rollers supporting the carriage for movement over the surface of the table 8 and one of the rollers having drivingly connected therewith an electrical propelling means generally indicated by the reference numeral 12 and hereinafter more fully described. The several wheels 11 are mounted upon suitable bearings which latter are fastened to forks 13, the upper ends of which are rotatively positioned in the chassis of the wind recorder carriage in such a manner that rotation for steering is possible. Each one of the forks 13 is provided with a sprocket or pulley 14, the latter arranged for engaging a suitable chain or similar drive 15 in such a manner that rotation imparted to any one of the forks 13 will likewise be imparted to the remaining forks in such a manner that all the supporting wheels 11 will be caused to yaw through a like angle. A spring clip 34 (see Fig. 3) is provided for taking up slack in the chain 15 by bearing against the chain to apply a tension load thereto. It is this yawing of all wheels in response preferably to the movement of a hand wheel 16 which steers the wind-recorder carriage in accordance with the desired wind direction that it is intended to introduce into the problem. The wheel 16 is provided with suitable marks for indicating direction, such as north, east, south and west and the intermediate points of the compass as shown in Figure 3. In order that it will be easy to select this proper wind direction, an indicating pointer 17 is fastened to the surface 6 or to some portion of the wind recorder carriage in such a manner that it serves to point out the selected wind direction. Having selected this wind direction, it is desired to maintain the value so selected for a period of time and in order that there will be no change in the selected wind direction while the wind recorder carriage moves, a suitable clamping element 18 is provided to restrain the wheel 16 from accidental movement.

This clamping device is simply a screw fitted into the chassis of the wind recorder carriage and provided at its lower end with a ball constructed of some material, such as rubber, that will impart a suitable snubbing or clamping action to the wind direction wheel 16. It can be seen that by rotation of the wheel 16 the wind recorder carriage can be caused to run in any selected direction to simulate a wind direction from any point of the compass.

In order that the effect of wind speed may be introduced, the present invention provides two alternative forms of the driving mechanism 12. One form is that in which selected speeds, such as 12 M. P. H., 25 M. P. H., 50 M. P. H. and 100 M. P. H., may be chosen, depending upon the scale of the chart used and the speed of the motor drive. Another form of the invention is that in which a large variety of speeds may be selected simply by varying the speed of the driving motor and indicating this speed on a suitable tachometer type of instrument.

In the former version of the invention there is shown in Figure 1 (a) at 12 a self-contained unit which consists of an electric motor of either the alternating current or the constant speed direct current type which is suitably positioned on the fork 13 and fitted with a change gear mechanism to supply movement to the drive wheel 11'. The details of this arrangement are not shown in the drawing since it is believed that the combination of an electric motor with a change gear transmission is so well known that detailed description is not necessary. A suitable electric cable with its connector is partially shown at 19, through which is supplied the electric energy necessary for serving the motor.

In the latter version as noted above for supplying varying wind speeds reference is made to Figure 4 which shows the drive wheel 11", the shaft extension of which is fitted with a suitable pinion 20 which in turn engages the gear 21, the latter extending from the gear reduction unit 22 which is fastened by means of the stud 23 to the lower extension of the fork 13. The gear reduction element 22 is also provided with a pinion 24 which engages an idler gear 25, the latter gear being driven by a pinion gear 28 fixed on the armature shaft of an electric motor 27, suitably secured to the wheel fork 13. The motor 27 is preferably of the direct-current shunt-wound type, which may have its speed regulated in a well-known manner by adjustment of the variable resistance 35 inserted in series with the motor field windings as illustrated in the circuit diagram (Fig. 6), which resistance determines the relative current flowing in the armature and field circuits, thereby permitting any speed within suitable limits to be obtained, the speed for any particular setting of the resistance being thereafter substantially constant. By means of the adjustable-speed motor 27, the wind-recorder carriage 9 may be propelled over the surface of the table 8 at a velocity proportional to any desired assumed wind velocity, the particular scale of the charts employed, of course, being considered. In order to determine the proper motor speed for any desired simulated wind velocity when a chart 7 (Fig. 3) of a particular scale is employed, the idler gear 25 is mounted on and secured to the shaft 25' of a small tachometer 26, which may be of any well-known construction such as the centrifugal, chronometric, or magnetic type. The tachometer 26 is provided with a dial 26a (Fig. 5) having thereon a plurality of concentric scales, each graduated in terms of simulated wind velocity for a particular map scale—such as, one inch equals 1000 miles, one inch equals 500 miles, etc. The tachometer 26a cooperates with a pointer 26b (Fig. 5) positioned by the speed-responsive mechanism (not shown) of the tachometer 26, in accordance with the instant speed of the driving motor 27, so that the speed of the motor may be interpreted in terms of simulated wind velocity when the scale of the map to be employed is known. The tachometer 26 is suitably supported in a casting 29 which encloses the driving mechanism and is secured to the driving-wheel fork 13 by removable screws 30 and 31. The tachometer 26 is secured in the casting 29 by means of removable set screws 32 and 33 and serves as a support for the gear 25 to maintain the same in proper meshing relation with gears 24 and 28. The casing of the tachometer extends beyond the casting 29 so that its dial is visible to the instructor or other observer. Since, in the solution of a ground trainer wind problem, it is desirable to know the actual simulated air speed of the trainer, a tachometer 26' similar in all respects to the tachometer 26 may be connected to one of the driving motors of the course recorder 1 (Fig. 1 (b)), the tachometer dial being graduated similarly to the dial 26a (Fig. 5) except that the velocity indicia are arranged to indicate simulated trainer air speeds. A suitable inked roller 11''' of well understood construction supplies ink to the tread of the wheel 11" to provide means for tracing the wind direction and path at different times during the problem on a chart or map 7a (Fig. 1 (a)), which has its coordinate axes respectively parallel with the coordinate axes of the charts 7 and 7b, as this is of value in studying the results of the problem to determine the time or point in a problem when, say, a wind shift was encountered; or in further analyzing the simulated wind phenomena such as squall line passage encountered during the course of the problem.

*Operation*

In the operation of this invention a suitable map or chart is selected and placed upon the wind recorder carriage and the latter together with the course recorder of conventional design but with the stylus arm 3 attached thereto are placed on the flight table 8. The pen or pencil of the stylus arm is allowed to bear lightly, by adjusting the counterweight 10, at the point at which it is desired to begin the problem, such as might be indicated at C in Figure 3. The wind direction is then properly set off by aid of the hand wheel 16 described above and, depending upon the particular variation of the invention, the wind speed is adjusted either by means of the change gear mechanism shown in Figure 1 (a) or by means of adjusting the motor speed 27 by means of the rheostat 35 shown in Figure 6. The wind recorder carriage therefore will, when the circuit is properly closed, move in the selected direction with the selected wind speed, and a tracing or record, of ground track or course will be made on the map 7 beginning with the point C (Figure 3) to indicate the position of the aircraft in flight. The instructor, who is charged with the duty of supplying the correct aural signal, will impart this signal in such a manner so that the student flying the problem will direct the ground trainer course in such a manner that movement will be imparted to the course recorder and its tracing pen to solve the given problem. In the event that the problem consisted of flying from the point C to the radio range on-course signal zone as shown in Figure 3, and thence down the simulated radio range to the cone of silence, a tracing would be left similar to that shown on the chart of Figure 3. Obviously allowances will have to be made by the student taking the instruction for the wind and its direction and velocity, since the signal that he receives is the result of the related movement between the course recorder and the wind course recorder carriage as shown in Figure 1.

As the pen tracer begins to leave a record of ground track on the map 7 of Figure 3, two other records are being left, one on the chart 7b, placed under the course recorder 1 the other on the chart 7a, placed under the wind recorder carriage, both on the surface 8. It should be obvious that the three maps or charts are identical and are necessarily oriented one with the other prior to the beginning of the problem. By making the charts of a translucent material and starting the individual records at the same points on each respective chart, the charts may be superimposed to demonstrate to the student the effect of the simulated wind on the assumed flight of the trainer, it being apparent how the wind and air speed components vectorially combine to give the resultant ground track of the assumed trainer flight.

As the problem proceeds it may be desired to introduce the effect of a wind shift line crossing such as when the wind shifts from say south 20 M. P. H. to northwest 40 M. P. H. This in reality takes time and follows generally well known meteorological laws. Depending upon the violence of such phenomena it may be desired to employ selected technique in slowing the wind rate and then veering the wind direction and again increasing the speed. All this is possible in the present preferred form of the invention and may be performed with a nicety, unknown to the present art. A record of changing headings, courses and wind patterns for later study and critique purposes is also maintained.

It should also be obvious that by aid of the tachometer 26 attached to the wind recorder carriage and the tachometer 26' attached to the course recorder instantaneous values of wind speed and air speed may be read. Ground speed is derived from timing the passage of the pen tracer between map details as indicated above. By entering the values of wind speed on chart 7a, air speed on chart 7b and ground speed on chart 7 alongside the respective tracings, the charts with the respective velocity notations form a complete history of the problem, which may be employed in making numerical calculations or for other purposes at a future time.

While I have disclosed one form of the invention it will be apparent to those skilled in the art, that other modifications may be made falling within the scope of the invention as defined by the appended claims.

I claim:

1. In combination, a supporting surface, a carriage adapted to be propelled over said surface at a velocity proportional to the assumed air speed of an aircraft and directionally controlled in accordance with the instant heading of an associated ground trainer, a tracer device supported by said carriage and movable therewith, a second carriage movable over said surface at a velocity proportional to the velocity of an assumed wind, means for steering said second carriage in the direction of said assumed wind, and a record chart carried by said second carriage and movable therewith, said record chart being adapted to have a record impressed thereon by said tracing device representing the ground track of said assumed aircraft flight.

2. The structure as claimed in claim 1, said steering means including means operable at will for changing the directional heading of said second carriage.

3. The structure as claimed in claim 1, said steering means including means operable at will for changing the directional heading of said second carriage, and other means operable at will to vary the velocity of said second carriage.

4. The structure as claimed in claim 1, including a second record chart, a second tracing means carried by said first-named carriage and adapted to trace the air course of the assumed flight of said aircraft on said second record chart, a third record chart, and a third tracing means movable with said second carriage and adapted to trace the course of the assumed wind on said third record chart, all of said tracing means being operable simultaneously to impress records on their respective associated record sheets.

5. Course-recording mechanism of the character described, comprising a record chart, a tracing device having means adapted to impress a course record on said chart, means for imparting an absolute motion to said tracing device in a plane parallel to said record chart with a velocity proportional to the assumed air speed of an aircraft, means for controlling the directional heading of said tracing device to simulate the assumed instant directional heading of said aircraft, and means for propelling said chart to move in a plane parallel with the plane of motion of said tracing device at a velocity proportional to the assumed velocity of a wind and in a direction equivalent to the direction of said assumed wind, the motion of said chart being independent of the means for moving said tracing device, and the resultant motion between said tracing device and said record chart causing said tracing device to trace the ground track of the assumed flight of said aircraft when subjected to the effects of said assumed wind and separate means for recording the absolute motion of said chart-propelling means, all of the recording means being simultaneously operable.

6. A wind-simulating course-recording device for use with aviation ground trainers, comprising three identical record charts arranged with the respective coordinate axes thereof in parallel planes; a movable means adapted to be moved at a velocity and in a direction representing the air speed and direction of the assumed flight of an aircraft; tracing means carried by said movable means and adapted to impress a record on a first one of said record charts representing the air path of the assumed flight of said aircraft; a second tracing means carried by said movable means and adapted to cooperate with a second one of said record charts; a second movable means adapted to move in a plane parallel with said first-named movable means with a velocity and in a direction representing an assumed wind, said second record chart being carried by said second movable means and displaced therewith, relative motion between said second tracing means and said second record chart representing the ground track of the assumed aircraft flight; and a third tracing means cooperating with the third one of said record charts to record the instant course of the assumed wind relative to the coordinate axes of said third chart, said third tracing means being carried by and movable with said second movable means.

7. The structure as claimed in claim 6, in which said record charts may be superimposed after the completion of the recording thereon to illustrate the instant relation between the air track, ground track, and wind path during the said assumed aircraft flight.

8. The structure as claimed in claim 6, in which said first and second movable means are each provided with speed-indicating means to indicate the instant respective velocities thereof.

9. The structure as claimed in claim 6, in which said second-named movable means is provided with speed-indicating means to indicate the instant speed thereof in terms of wind velocity.

10. The structure as claimed in claim 6, in which the first and second movable means each comprise a power-driven, steerable, wheeled carriage, said carriages being movable on a common supporting surface and the directional heading and speed of the carriage forming the second movable means being selectively adjustable at will through manually actuated means.

CARL J. CRANE.

REFERENCES CITED

The following references are of record in the file of this patent:

UNITED STATES PATENTS

| Number | Name | Date |
| --- | --- | --- |
| 830,718 | Holt | Sept. 11, 1906 |
| 1,123,795 | Pollen et al. | Jan. 5, 1915 |
| 1,293,747 | Ford | Feb. 11, 1919 |
| 1,596,936 | Mengden | Aug. 24, 1926 |
| 1,701,582 | Mengden | Feb. 12, 1929 |
| 1,745,933 | Kauch | Feb. 4, 1930 |
| 1,985,266 | Smith et al. | Dec. 25, 1934 |
| 2,099,857 | Link | Nov. 23, 1937 |
| 2,163,746 | Courtois-Suffit et al. | June 27, 1939 |
| 2,164,412 | Koster | July 4, 1939 |
| 2,179,663 | Link | Nov. 14, 1939 |

FOREIGN PATENTS

| Number | Country | Date |
| --- | --- | --- |
| 153,622 | Great Britain | July 3, 1919 |
| 719,811 | France | Nov. 24, 1931 |